June 2, 1925.                                                    1,540,404
A. KOHL
POWER TRANSMITTING ATTACHMENT FOR MOTOR VEHICLES
Filed Aug. 25, 1924           2 Sheets-Sheet 1
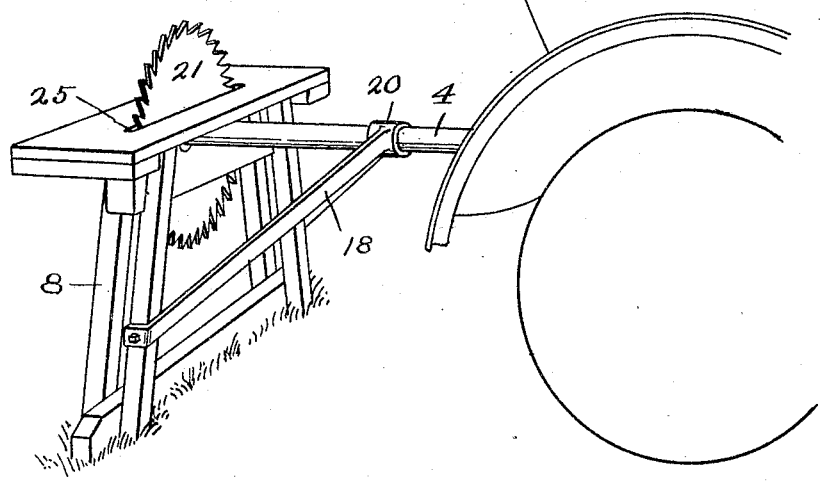
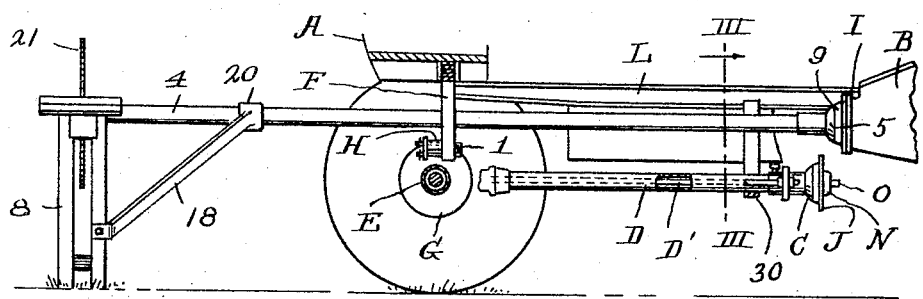
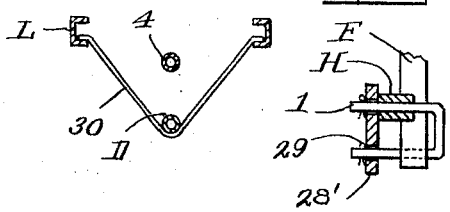
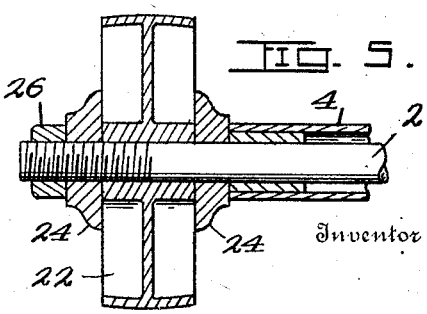
Witness:
Fred G. Fischer.
Inventor
Albert Kohl,
F. G. Fischer, Attorney

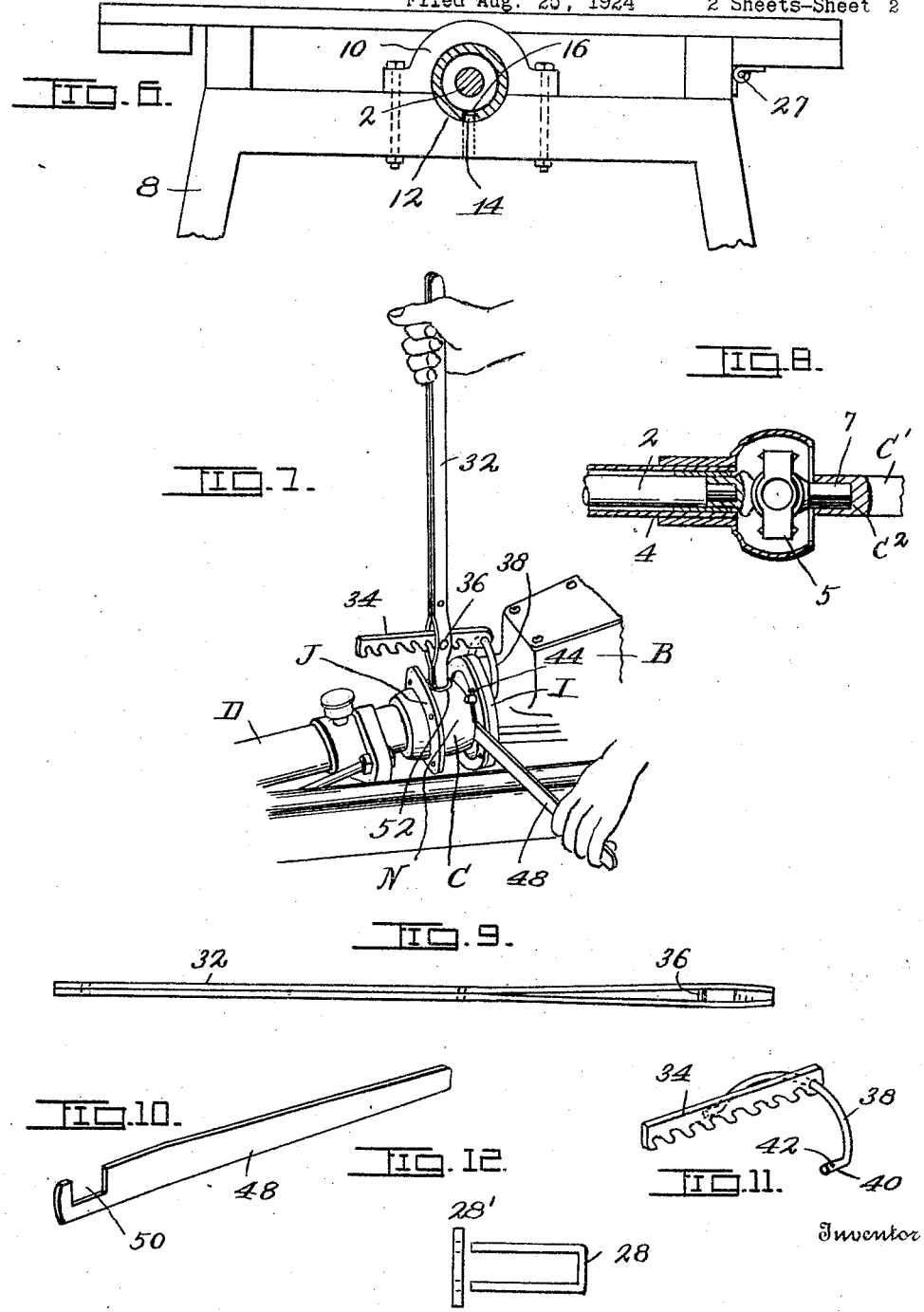

Patented June 2, 1925.

1,540,404

UNITED STATES PATENT OFFICE.

ALBERT KOHL, OF PLEASANTON, KANSAS.

POWER-TRANSMITTING ATTACHMENT FOR MOTOR VEHICLES.

Application filed August 25, 1924. Serial No. 733,934.

*To all whom it may concern:*

Be it known that I, ALBERT KOHL, a citizen of the United States, residing at Pleasanton, in the county of Linn and State of Kansas, have invented certain new and useful Improvements in Power-Transmitting Attachments for Motor Vehicles, of which the following is a specification.

My invention relates to power transmitting devices especially designed for the purpose of utilizing the power of motor vehicles for operating light machinery such as circular saws, pumps, ensilage cutters and elevators, churns, etc. One object of the invention is to provide a relatively simple and inexpensive power transmitting device which may be substituted for the usual propeller shaft and differential of the motor vehicle, so that said parts will not be subjected to wear while my power transmitting device is in operation.

A further object is to provide simple and inexpensive tools whereby the substitution above referred to can be easily accomplished.

Other objects will hereinafter appear, and in order that the invention may be readily understood, reference will now be had to the accompanying drawings, in which:

Fig. 1 is a broken perspective view of a motor vehicle with my power transmitting device connected thereto.

Fig. 2 is a broken longitudinal section of the motor vehicle with my power transmitting device connected thereto.

Fig. 3 is a vertical cross section on line III—III of Fig. 2, showing a support for the usual propeller shaft and its housing when not in use.

Fig. 4 is a side elevation partly in section of means for connecting the rear spring of the motor vehicle to the spring hangers to permit the rear axle shaft and parts connected thereto to be moved backwardly and forwardly when substituting my power transmitting device for the usual propeller shaft and its housing.

Fig. 5 is a broken longitudinal section showing the rear portion of my power transmitting device equipped with a pulley in place of the circular saw disclosed by Fig. 1.

Fig. 6 is a broken side elevation of a table for supporting the rear portion of my power transmitting device.

Fig. 7 is a detail perspective showing the use of my special tools in connecting up the universal joint of the vehicle after my power transmitting device has been in use and then removed.

Fig. 8 is a fragmentary section of my power transmitting device connected to the driven shaft of the vehicle.

Fig. 9 is a detail of a lever forming one of the special tools above referred to.

Fig. 10 is a detail perspective view of a bar for guiding the forward end of the universal joint into the socket of the driven shaft of the vehicle transmission.

Fig. 11 is a detail perspective view of a notched bar on which the lever disclosed by Figs. 7 and 9 may be fulcrumed.

Fig. 12 is a detail of one of the elongated shackles for slidably connecting the ends of the rear spring of the motor vehicle to the spring hangers.

Referring now in detail to the different parts, A designates a motor vehicle of the Ford type with the rear wheel and differential removed to show one of the pair of elongated shackles 1, which are substituted for the regular shackles. The motor vehicle A embodies the usual gear case B, universal coupling C, driven shaft C', propeller shaft housing D, propeller shaft D', rear axle housing E, rear spring F, and rear spring hangers H on the flanges G at the ends of said rear axle housing E.

Referring now more particularly to the parts constituting the present invention, 2 designates a mandrel journaled in a tubular housing 4 and equipped at its forward end with a universal coupling 5, corresponding to the universal coupling C. The rear end of the mandrel housing 4 extends rearwardly of the motor vehicle A, and is supported by a table 8, which is provided with a cap 10 for holding said housing 4 firmly in a recess 12 in said table. The table 8 is provided at its recessed portion 12 with a dowel 14 entering a corresponding hole 16 in the mandrel housing 4 to overcome any tendency of the rear end thereof to rotate with said mandrel 2. In addition to the mandrel housing 4 and the table 8 being connected by the cap 10, they are further connected by braces 18 and a sleeve 20, Figs. 1 and 2.

The rear end of the mandrel 2 projects from the rear end of the housing 4 to receive either the circular saw 21 shown by Fig. 1, or the pulley 22 disclosed by Fig. 5, and either of which is firmly clamped in position upon said mandrel by means of washers 24 and a nut 26. The table top has a slot 25 through which the saw 21 projects, and in order that said top may be raised to clear the pulley 22, when in use, it is connected to the table by hinges 27.

30 designates a support suspended from the channel bars L of the chassis for the purpose of holding the forward end of the propeller shaft housing D above the ground, so that the motor vehicle with my power transmitting attachment connected thereto may be moved from place to place if desired without the retaining ring J of the universal coupling C running into the ground.

32 designates a lever used when connecting the forward end of the universal joint C with the socket at the rear end of the usual driven shaft C' within the gear case B.

34 designates a notched bar to provide a bearing for the fulcrum 36 of the lever 32. Said notched bar 34 is provided at its forward end with an anchor 38 having rearwardly turned ends 40 to pass through two of the bolt holes in the flange I, on the rear of the gear case B, to hold said anchor 38 and the notched bar 34 in place. The rearwardly turned ends 40 have holes 42 to receive pins 44 which prevent said ends from being withdrawn from the flange I when the lever 32 is in operation.

48 designates a bar for guiding the forward ends of the universal joints C and 5 into the socket in the rear end of the driven shaft C'.

In practice when it is desired to connect my power transmitting device to the motor vehicle, the regular shackles which connect the rear spring F to the hangers H are removed, and the elongated shackles 1 are substituted. The retaining ring J of the universal joint C is then disconnected from the flange I of the gear case B to permit the rear axle housing and the propeller shaft assembly to be pushed backwardly to uncouple the forward end of the universal joint C from the driven shaft C'. During this operation the spring hangers H slide backwardly upon the elongated shackles 1, while the spring F remains stationary with the chassis of the motor vehicle. The forward end of the propeller shaft housing D is then lowered upon the support 30, Figs. 2 and 3, so that it will be out of the way of the mandrel housing 4 which is moved forwardly to connect the universal joint 5 to the driven shaft C'. In carrying out the foregoing operation the recessed portion 50 of the bar 48 is placed beneath the forward end 7 of the universal joint 5 to guide said end into the socket C² at the rear end of the driven shaft C'. The retaining ring 9 of the universal joint 5 is then secured to the flange I of the gear case B, after which the rear end of the mandrel housing 4 is passed through the sleeve 20 and secured to the table 8 by the cap 10. The saw 21 or the pulley 22 is then mounted on the rear end of the mandrel 2 and my power transmitting attachment is ready for use.

After work with my power transmitting attachment has been finished, said attachment is disconnected from the vehicle, and the universal joint C and retaining ring J are connected to the driven shaft C' and the flange I, respectively. The foregoing is readily accomplished by placing the anchor 38 in position on the flange I and mounting the fulcrum 36 of the lever 32 in one of the notches 34. The lower end of the lever 32 is then placed in the hole 52 in the housing N of the universal joint C, after which the upper end of said lever 32 is pushed rearwardly with one hand, while the forward male end O of the universal joint C is guided into the socket C² at the rear end of the driven shaft C' by the bar 48, which is held by the other hand. The foregoing operation with the lever 32 advances the rear axle and propeller shaft housing assembly, so that the retaining ring J may be bolted to the flange I. It also brings the hangers B in line with the spring F so that the elongated shackles 1 may be removed and the regular shackles substituted.

Changing the shackles can be readily accomplished by driving a wedge between the rear axle housing E and one end of the spring F to take the weight off the adjacent shackles and after the same have been changed the wedge is removed and driven beneath the opposite end of the spring F, so that the shackles at said end may be readily changed.

From the foregoing description it is apparent that I have provided a power transmitting device embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. In a power transmitting attachment for motor vehicles, a mandrel, a universal joint at the forward terminal of said mandrel for connection with the transmission mechanism of said motor vehicle, and elongated shackles connecting the rear spring to the rear spring hangers of said vehicle to permit the rear axle and propeller shaft assembly of the vehicle to move forwardly or backwardly to a limited degree independently of the rear spring and chassis while said universal joint is being connected or disconnected from the power transmission mechanism of the vehicle.

2. In a power transmitting attachment for motor vehicles, a mandrel, a universal joint at the forward terminal of said mandrel for connection with the transmission mechanism of said motor vehicle, power transmitting means mounted upon said mandrel, elongated shackles connecting the rear spring to the rear spring hangers of said vehicle to permit the rear axle and propeller shaft assembly of the vehicle to move forwardly or backwardly to a limited degree independently of the rear spring and chassis while said universal joint is being connected or disconnected from the power transmission mechanism of the vehicle, and means for guiding the forward portion of the unversal joint into engagement with the vehicle transmission.

3. In combination with a motor vehicle, elongated shackles for connecting the rear spring to the rear spring hangers of said vehicle to permit the rear axle and propeller shaft assembly to move backwardly or forwardly to a limited degree independently of the vehicle gear case when the universal joint of said propeller shaft assembly is disconnected from the driven shaft in said gear case, a bar detachably anchored to said gear case, and a lever fulcrumed on said bar and adapted to advance the rear axle and propeller shaft assembly to cause said universal joint to engage said driven shaft.

4. In combination with a motor vehicle, elongated means for connecting the rear spring to the rear spring hangers of said vehicle to permit the rear axle and propeller shaft assembly to move backwardly or forwardly to a limited degree independently of the vehicle gear case when the universal joint of said propeller shaft assembly is disconnected from the driven shaft in said gear case, a bar detachably anchored to said gear case, a lever fulcrumed on said bar and adapted to advance the rear axle and propeller shaft assembly to cause said universal joint to engage said driven shaft, and a bar for guiding the forward end of the universal joint into the socket at the rear end of said driven shaft.

In testimony whereof I affix my signature, in the presence of two witnesses.

ALBERT KOHL.

Witnesses:
L. J. FISCHER,
F. C. FISCHER.